(12) United States Patent
Singer

(10) Patent No.: US 6,965,471 B2
(45) Date of Patent: Nov. 15, 2005

(54) ASTROMETRY SYSTEM USING TWO TELESCOPES, ONE OF WHICH IS AN ASTROMETRY TELESCOPE

(75) Inventor: Christian Singer, Cannes (FR)

(73) Assignee: Alcatel, Paris (FR)

( * ) Notice: Subject to any disclaimer, the term of this patent is extended or adjusted under 35 U.S.C. 154(b) by 89 days.

(21) Appl. No.: 10/766,824

(22) Filed: Jan. 30, 2004

(65) Prior Publication Data

US 2004/0207916 A1   Oct. 21, 2004

(30) Foreign Application Priority Data

Jan. 31, 2003   (FR) .................................. 03 01104

(51) Int. Cl.$^7$ ............................................. G02B 23/00
(52) U.S. Cl. .................... 359/399; 356/139.01
(58) Field of Search ................... 359/399; 356/139.01, 356/300–328; 250/203.1, 203.3, 203.4, 203.6

(56) References Cited

U.S. PATENT DOCUMENTS

| | | | |
|---|---|---|---|
| 3,100,264 A | * | 8/1963 | Jaffe et al. ............... 250/203.6 |
| 3,977,787 A | | 8/1976 | Fletcher et al. |
| 4,449,817 A | * | 5/1984 | Abler ......................... 356/145 |
| 5,012,081 A | | 4/1991 | Jungwirth et al. |
| 5,935,195 A | | 8/1999 | Quine |
| 6,084,227 A | | 7/2000 | Rhoads |
| 6,452,538 B1 | | 9/2002 | Hoffman, III |

* cited by examiner

*Primary Examiner*—Mark A. Robinson
*Assistant Examiner*—Alessandro Amari
(74) *Attorney, Agent, or Firm*—Sughrue Mion, PLLC

(57) ABSTRACT

An astrometry system comprises an astrometry first telescope having first and second sightlines respectively corresponding to first and second fields of view and a first star detector system in a first focal plane. A first optical system combines first and second light beams from stars in the first and second fields of view and substantially parallel to the first and second sightlines and delivers them to the first star detector system. A second telescope has a third sightline substantially parallel to one of the first and second sightlines. There is a second star detector in at least one second focal plane. A second optical system collects a third light beam from the stars substantially parallel to the third sightline and delivers it to the second star detector. A processor determines the source field of view of each star detected as a function of whether it is detected either by only the first detector or conjointly by the first and second detectors.

13 Claims, 3 Drawing Sheets

ASTROMETRY SYSTEM USING TWO TELESCOPES, ONE OF WHICH IS AN ASTROMETRY TELESCOPE

CROSS-REFERENCE TO RELATED APPLICATIONS

This application is based on French Patent Application No. 03 01 104 filed Jan. 31, 2003, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of optical systems, more particularly that of optical astrometry systems.

2. Description of the Prior Art

Astrometry is a well known technique consisting in simultaneously observing, along two sightlines, two "fields of view" containing stars, determining the positions of the stars in each field of view, and measuring the real positions of the stars by comparing their positions within their respective fields of view. Obtaining a given measurement accuracy demands at least equivalent stability on each sightline.

There are two well known solutions for implementing the above technique.

A first solution consists in using a single telescope having two sightlines defined by a first mirror, consisting of two portions angularly separated by half the angle between the two sightlines, and combining the two light beams at the first mirror. In this first solution, as implemented on the HIPPARCOS sky mapper satellite, the required stability of the two sightlines is reflected in a demand for angular stability in respect of only the two portions of the first mirror. However, because there is only one focal plane, identifying the field of view pertaining to an observed star must be based a priori on an existing catalog, which is a major handicap in the case of measuring the positions of new stars.

A second solution consists in using two telescopes each having a sightline and the two beams of which are combined in a single focal plane after forming an intermediate image at an intermediate focal plane. By placing a mask in the intermediate focal plane of one of the two telescopes, it is possible, after combining the two beams, to identify in the single focal plane the field of view pertaining to an observed star, thanks to a lateral shift of the two fields equal to a detection column. This solution can measure the positions of new stars, but requires that the sum of the stabilities of each component of each telescope be lower than the required measurement accuracy, which is particularly difficult to achieve, especially if the measurements are effected by telescopes on board a satellite rotating about a heavenly body, such as the Earth.

An object of the invention is therefore to improve on this situation.

SUMMARY OF THE INVENTION

To this end it proposes an astrometry system comprising an astrometry first telescope having first and second sightlines respectively corresponding to first and second fields of view, a first star detector system in a first focal plane, first optical means adapted to combine first and second light beams from stars in the first and second fields of view and substantially parallel to the first and second sightlines and deliver them to the first star detector system, a second telescope having a third sightline substantially parallel to one of the first and second sightlines, a second star detector in at least one second focal plane, second optical means adapted to collect a third light beam from the stars substantially parallel to the third sightline and deliver it to the second star detector, and processor means adapted to determine the source field of view of each star detected as a function of whether it is detected either by only the first detector or conjointly by the first and second detectors.

In a first embodiment, the first optical means comprise a combination mirror and two plane entry mirrors having normals offset from each other by a first angle substantially equal to half a second angle defined between the first and second sightlines and respectively adapted to receive the first and second light beams and to reflect them toward the combination mirror.

In a second embodiment, the first optical means comprise a concave entry mirror having first and second portions having normals each offset by a first angle substantially equal to a second angle defined between the first and second sightlines and respectively adapted to receive and to combine the first and second light beams.

Each plane mirror has a surface area substantially equal to half the surface area of an entry pupil of the astrometry telescope.

Each concave mirror portion preferably has a surface area substantially equal to half the surface area of an entry pupil of the astrometry telescope.

The second angle is preferably approximately 106°.

The first detector preferably has a first portion dedicated to detecting stars (for example a sky mapper) and connected to the processing means and a second portion dedicated to astrometry and comprising, for example, a first subportion dedicated to astrometry and a second subportion dedicated to broadband photometry (BBP).

When the second telescope is a spectrometry telescope, the second detector preferably comprises a first portion dedicated to star detection (for example a sky mapper) and connected to the processing means and a second portion dedicated to spectrometry and comprising, for example, a first subportion dedicated to medium band photometry (MBP) and a second subportion dedicated to radial velocity spectrometry (RVS).

The first and second detection portions preferably consist of detectors in the form of charge coupled devices (CCD).

The invention is particularly well suited, although not exclusively so, to astrometry effected on board a satellite capable of rotating on itself so that its first and second detector systems are scanned in accordance with a chosen scanning law.

Other features and advantages of the invention will become apparent on reading the following detailed description and examining the appended drawings.

DETAILED DESCRIPTION OF THE PREFERRED EMBODIMENT

The appended drawings constitute part of the description of the invention as well as, if necessary, contributing to the definition of the invention.

The invention relates to an astrometry system able to measure not only the positions of known stars but also the positions of unknown stars with high accuracy (typically of the order of 10 microarcsec). A system of the above kind is particularly well suited to measurements effected in space, in particular on board a mapping satellite or by a mapping instrument on board a spacecraft.

The following description considers, by way of illustrative example, that the system of the invention is installed on the supporting structure of a spun mapping satellite, for example one in orbit around a heavenly body such as the Earth. The period of precession of the satellite about the Earth is equal to a few tens of days and the angle of inclination of the rotation axis of the satellite relative to the direction of the Sun is equal to a few tens of degrees, for example.

Figure 1:
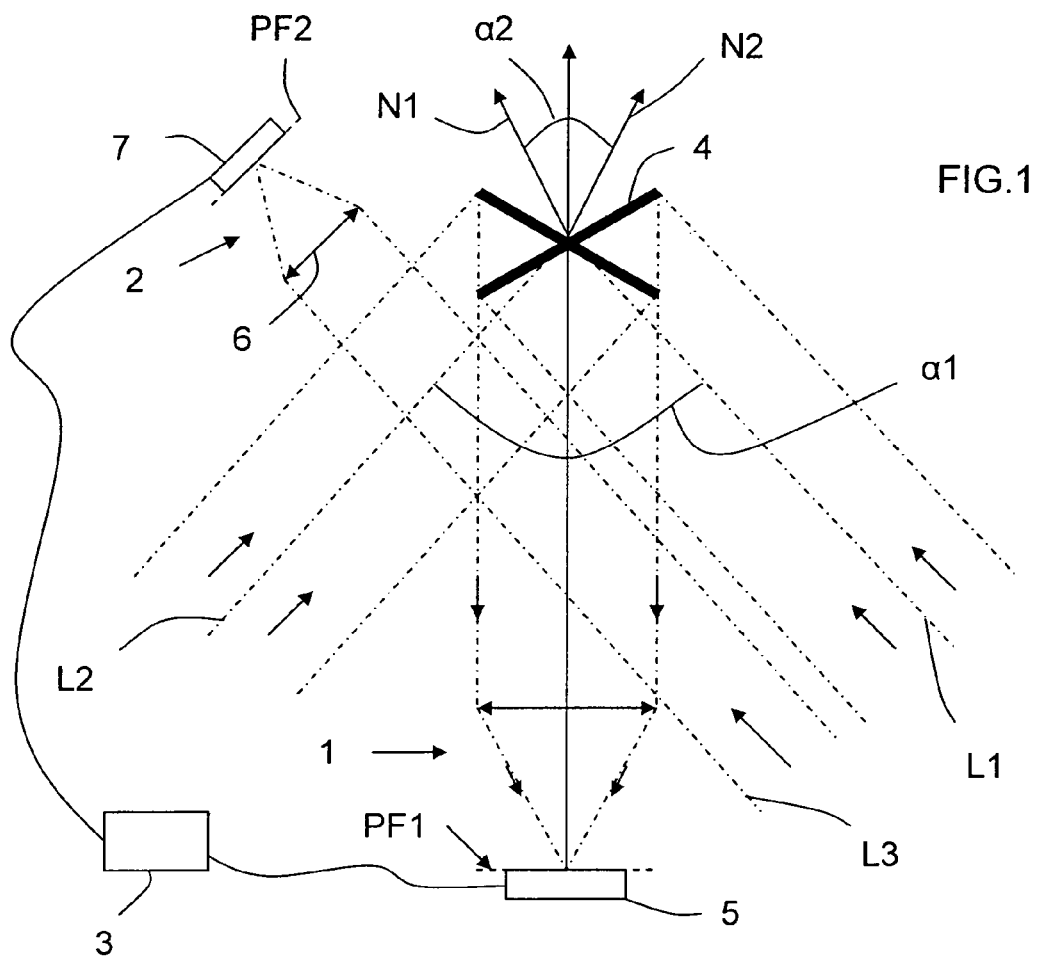
FIG. 1 is a diagram showing one example of the relative positions of an astrometry telescope and a spectrometry telescope of a measuring system according to the invention.

As shown in the FIG. 1 diagram, a measuring system according to the invention essentially comprises an astrometry first telescope 1 and a spectrometry (for example) second telescope 2, with both telescopes connected to a data processing module 3. Hereinafter the second telescope 2 is considered to be a spectrometry telescope, but this is not mandatory, as explained later.

To be more precise, the astrometry telescope 1 is of the type with two sightlines well known to the person skilled in the art. The astrometry telescope 1 therefore has a first sightline L1 and a second sightline L2 respectively corresponding to first and second fields of view in which stars to be observed are situated.

The astrometry telescope 1 further comprises a first optical module 4 (here represented in a highly simplified manner as two mirrors and a lens) for collecting first and second light beams coming from stars situated in the first and second fields of view and substantially parallel to the first and second sightlines L1 and L2, and for delivering said beams to a first star detector module 5 installed in a first focal plane PF1 and supplying the data processing module 3 with position data.

The astrometry telescope 1 is installed on the upper portion of a support torus of the structure of the satellite (not shown), for example.

The spectrometry telescope 2 is of the type with one sightline, also well known to the person skilled in the art. The spectrometry telescope 2 therefore comprises a third sightline L3 which, according to the invention, is substantially parallel to one of the first and second sightlines L1 and L2 of the astrometry telescope 1. In the example shown here, the third sightline L3 is substantially parallel to the first sightline L1, and therefore also corresponds to the first field of view.

The field of view of the spectrometry second telescope 2 must be at least equal to the field of view of the astrometry telescope 1. Moreover, the spectrometry second telescope 2 must be capable of resolving at least the same number of stars per square degree as the astrometry first telescope 1, and must therefore have substantially the same radiometry sensitivity.

The spectrometry telescope 2 further comprises a second optical module 6 (here represented in a highly simplified manner as a lens) for collecting a third light beam coming, in this example, from stars situated in the first field of view and substantially parallel to the third sightline L3, and for delivering this third beam to a second star detector module 7 installed in at least one second focal plane PF2 and supplying the data processing module 3 with position data.

The spectrometry telescope 2 is installed on the lower portion of the support torus of the satellite structure, for example.

The first and second sightlines L1 and L2 define an angle $\alpha 1$ that is preferably equal to approximately 106°.

The processing module 3 is for determining, from position data delivered by the first and second detector modules 5 and 7, the source field of view of each star detected. This is made particularly simple by the fact that the first and third sightlines L1 and L3 are substantially parallel. This is because, in this configuration, the first and third beams correspond to stars in the first field of view while the second beam corresponds to stars in the second field of view. Consequently, any star detected simultaneously by the first and second detector module 5 and 7 is in the first field of view and any star detected only by the first detector module 5 is in the second field of view.

The processing module 3 can therefore take the form of a multichannel comparator for comparing the data delivered by the first and second detector modules 5 and 7.

Figure 2:
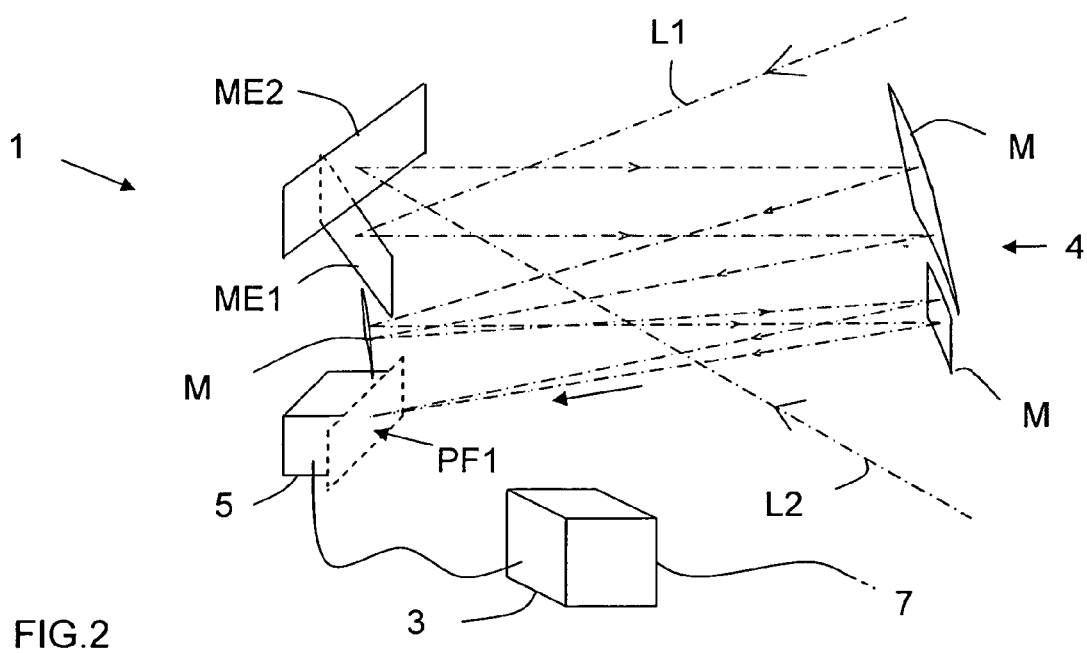
FIG. 2 is a diagram showing one embodiment of an astrometry telescope of a system of the invention.

One embodiment of an astrometry first telescope 1 of a system of the invention is described in more detail next with more particular reference to FIGS. 2 and 3.

In the present example, the first optical module 4 of the astrometry telescope 1 comprises first and second plane entry mirrors ME1 and ME2 for reflecting the first and second beams, respectively, toward a first combination mirror M1. The first and second plane entry mirrors ME1 and ME2 have normals N1 and N2 (shown in FIG. 1) offset from each other at an angle $\alpha 2$ substantially equal to half the angle $\alpha 1$ defined between the first and second sightlines L1 and L2.

Each plane mirror ME1 and ME2 preferably has a surface area substantially equal to half the surface area of the entry pupil of the astrometry telescope 1. The entry pupil of the astrometry telescope 1 is typically about 1.4 m×1 m.

The first combination mirror M1 is a concave mirror for combining the first and second beams and directing them toward a second convex mirror M2, for example. The first and second beams are then reflected by the second mirror M2 toward a third concave mirror M3, which causes them to converge toward the first focal plane PF1 containing the first detector module 5. The optical combination used in this embodiment of the astrometry telescope 1 is known as a "Korsch" combination, and comprises three off-axis aspherical mirrors M1, M2, M3.

Of course, the first optical module 4 can take a different form. The optical combination of the astrometry telescope must in fact be optimized as a function of optical parameters required by the application (field of view, size of entry pupil, and focal length). The focal length of the astrometry telescope 1 is typically a few tens of meters.

The first optical module 4 can instead include an entry mirror simultaneously constituting the combination mirror. To this end, the entry mirror can take the form of two concave mirror portions having normals each offset at an angle $\alpha 2$ substantially equal to the angle $\alpha 1$ defined between the first and second sightlines L1 and L2.

Figure 3:
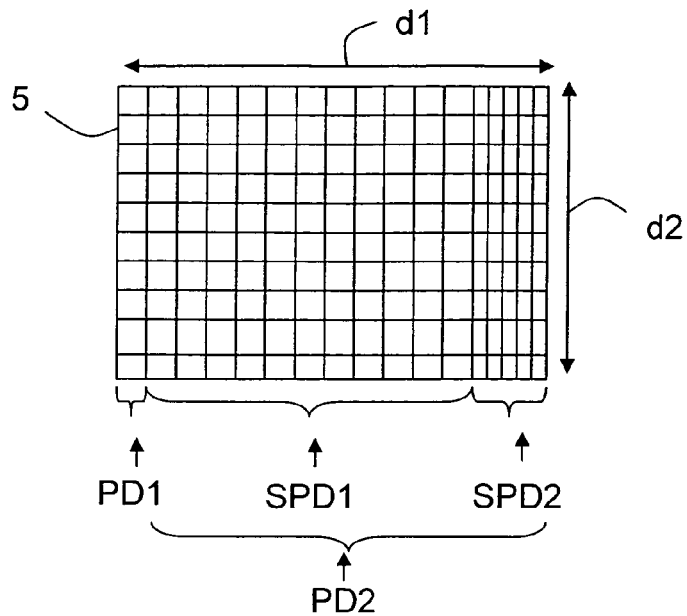
FIG. 3 is a diagram showing one embodiment of a detector module of an astrometry telescope of a system of the invention.

As shown in the FIG. 3 diagram, the first detector module preferably comprises first and second portions PD1 and PD2.

The first portion PD1 is dedicated to detecting stars and more particularly supplies the processing module 3 with position data that it uses to effect its comparisons. The first portion PD1 takes the form of what the person skilled in the art knows as a "sky mapper", for example. It consists of a column of CCD devices (ten such devices in this example).

The second portion PD2 is dedicated to astrometry. It preferably comprises a first subportion SPD1 dedicated to astrometry and a second subportion SPD2 dedicated to broadband photometry (BBP).

The first subportion SPD1 preferably consists of eleven columns of CCD devices (ten such devices per column in this example), and the second subportion SPD2 preferably consists of five columns of CCD devices (ten such devices per column in this example).

Each CCD device is made up of pixels having dimensions of the order of $10 \mu \times 30 \mu m$, for example. Moreover, the CCD matrix constituting the various portions of the first detector device 5 covers an area d1×d2 where the value of d1 is 750 mm, for example (which corresponds to approximately 0.737°) and the value of d2 is 600 mm, for example (which corresponds to approximately 0.92°).

The CCD matrix is scanned in accordance with the chosen scanning law of the satellite. The scanning frequency, which is equal to the rotation frequency of the satellite, is approximately 60 arcsec/second, for example.

Figure 4:
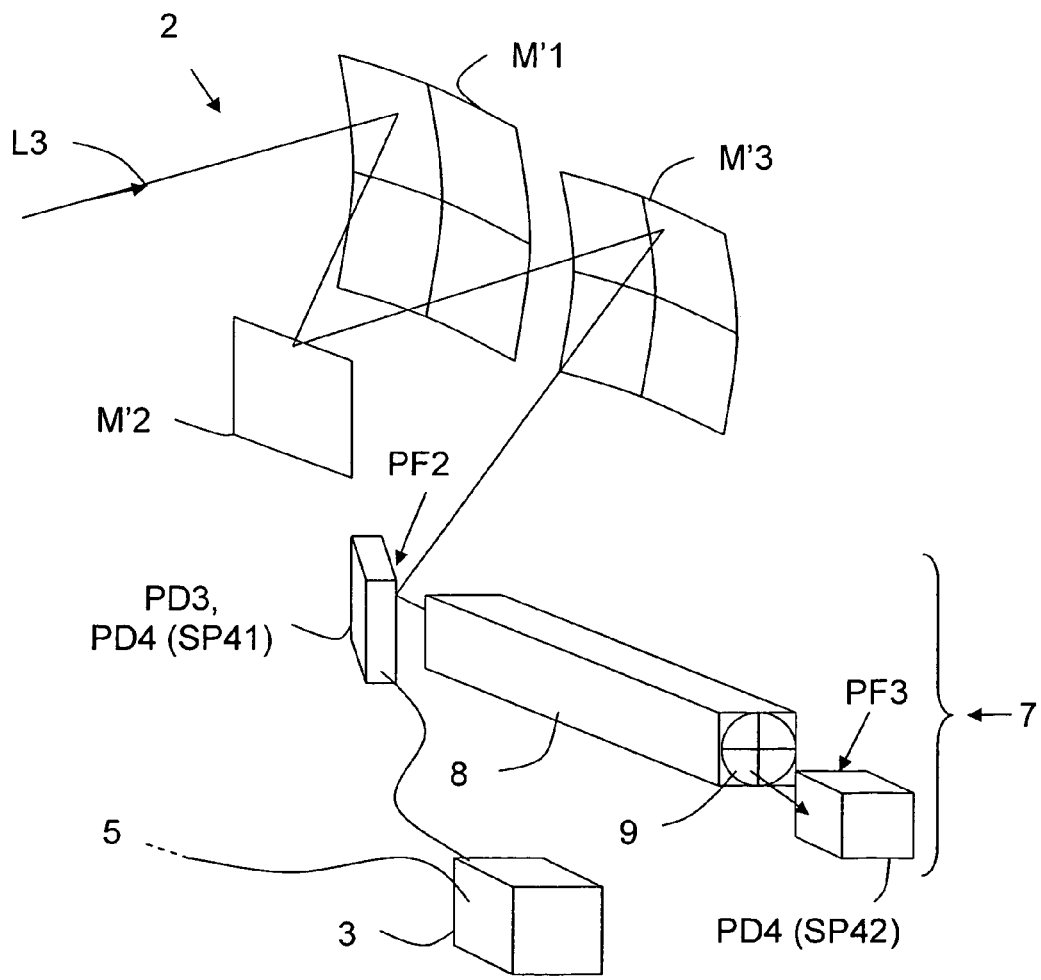
FIG. 4 is a diagram showing one embodiment of a spectrometry telescope of a system of the invention.

One embodiment of a second telescope 2 (of the spectrometry type in this example) of a system according to the invention is described in more detail next with more particular reference to FIGS. 4 and 5.

In the example shown, the second optical module 6 of the spectrometry telescope 2 comprises, for example, a well known optical combination consisting of three anastigmat mirrors M'1, M'2 and M'3. The first mirror M'1 is concave and reflects the third beam (parallel to the third sightline L3) toward the second mirror M'2, which is preferably convex, and in turn reflects the third beam toward the third mirror M'3, which is preferably concave. Finally, the third mirror M'3 causes the third beam to converge toward the second detector module 6.

According to the invention, the second telescope 2 comprises a detector module 7 capable of detecting stars with a resolution at least equal to that of the first detector module 5 of the astrometry telescope 1, and with substantially the same radiometry sensitivity. Consequently, the second detector module includes at least one detector matrix, preferably of the sky mapper type. This is why it is not obligatory for the second telescope 2 to be of the spectrometry type. It can in fact be a simple telescope equipped with a star detector system, for example of the sky mapper type.

If the second telescope 2a is a spectrometry telescope, the second detector module 7 comprises a first portion PD3 installed in the second focal plane PF2 of the spectrometry telescope 2 and dedicated to detecting stars and a second portion PD4 dedicated to spectrometry.

As indicated above, the first detector portion PD3 is preferably a "sky mapper" whose field of view is at least equal to that of the sky mapper PD1 of the first detector module 5 and which is capable of detecting stars of the same magnitude and of resolving at least the same quantity of stars as the sky mapper PD1 of the first detector module 5. It consists of at least one detector column preferably consisting of CCD devices that more particularly supply the processing module 3 with position data that it uses to effect its comparisons. For example, the column includes ten CCD devices each comprising a multiplicity of pixels.

The sky mappers used are typically capable of detecting stars of magnitude 20 and of resolving 25 000 stars per square degree, and the field of view of the sky mapper of the second detector module 5 preferably extends in a direction perpendicular to the scanning direction over an angle (of 1.6°, for example) greater than that of the sky mapper of the first detector module 5 (which is equal to 0.737°, for example).

Figure 5:
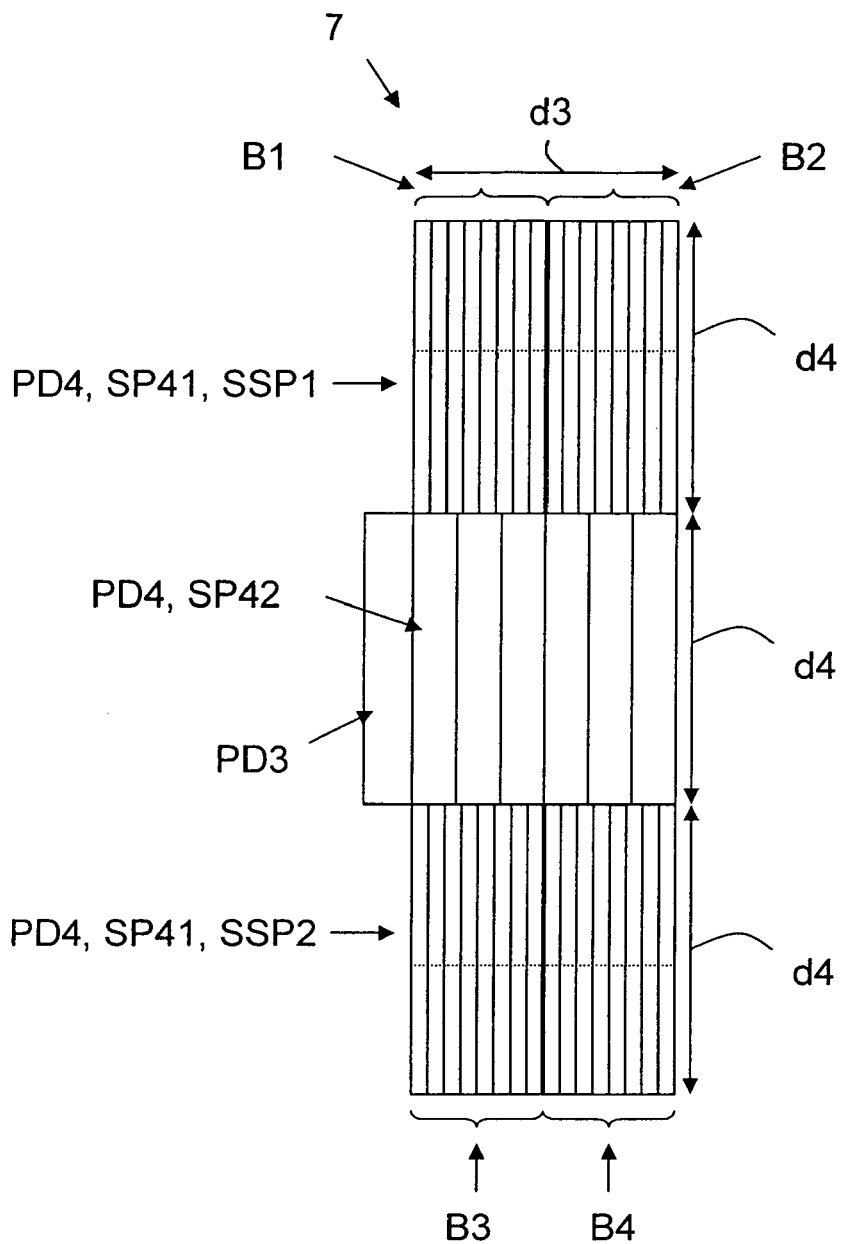
FIG. 5 is a diagram showing one embodiment of a detector module of a spectrometry telescope of a system of the invention.

As shown in FIG. 5, the second portion PD4 comprises two subportions SP41 and SP42.

The first subportion SP41 is dedicated to medium band photometry (MBP), for example. Like the sky mapper PD3, it lies in the second focal plane PF2. Moreover, it preferably has substantially identical first and second portions SSP1 and SSP2 spatially separated from each other and, in this example, consisting of a block B1 (or B3) of eight predominantly red detector strips and a block B2 (or B4) of eight predominantly blue detector strips. Each strip of the block Bi is preferably made up of CCD devices, each of which comprises a multiplicity of pixels having dimensions of the order of 10 $\mu m \times 15$ $\mu m$, for example. Moreover, the CCD matrix constituting each portion SSP1 or SSP2 covers an area d3×d4, where d3 is preferably approximately 74 mm (which approximately corresponds to 2°) and d4 is preferably approximately 60 mm (which approximately corresponds to 1.6°).

The second subportion SP42 lies in a third focal plane PF3 of the spectrometry second telescope 2, on the downstream side of the first portion PD3 and of an optical shaping assembly 8 consisting of optical components 9 defining a collimator/disperser/imager operating with unity magnification.

The second subportion SP2 is dedicated to radial velocity spectrometry (RVS), for example. It preferably comprises a block 6 of detector strips for detecting photons in the range [849 nm–874 nm], for example. Each strip of the block is preferably made up of CCD devices, each of which comprises a multiplicity of pixels having dimensions of the order of 10 $\mu m \times 15$ $\mu m$, for example. Moreover, the CCD matrix constituting the subportion SP42 covers an area d3×d4, in which d3 is preferably approximately 74 mm (which approximately corresponds to 2°) and d4 is preferably approximately 60 mm (which approximately corresponds to 1.6°).

The CCD detector devices of the second detector module 7 are scanned in accordance with the chosen scanning law of the satellite. As indicated above, the scanning frequency is 60 arcsec/second, for example.

The astrometry and spectrometry measurements effected by the first and second detector modules 5 and 7 are entirely conventional and are therefore not described here. What is important is for the comparison effected by the processor module 3, based on position data delivered by the sky mappers PD1 and PD3 of the first and second detector modules 5 and 7, to be able to discriminate effectively the stars detected in the first and second fields of view, and consequently to enable the first and second modules 5 and 7 to measure the real positions of the stars and their Doppler characteristics, by comparing their positions within their respective fields of view. In other words, once the processing module 3 has determined the field of view to which a star belongs, it reports it to the first detector module 5 which can then measure its position accurately by comparing its positions in the first and second fields of view.

Thanks to the invention, it is possible to loosen the dimensional stability constraints in respect of the optical components of the astrometry telescope and consequently to limit the stability demanded of the two plane entry mirrors. Furthermore, the invention eliminates one of the two astrometry telescopes used in one of the prior art techniques, provided that the dimension of the entry pupil of the astrometry telescope is twice that of each astrometry telescope used in the prior art technique. Moreover, the invention can effect highly accurate position measurements without reference to an existing star catalog, as is required in the case of another prior art technique.

The invention is not limited to the embodiments of the astrometry system and satellite described hereinabove by way of example only, but encompasses all variants thereof within the scope of the following claims that the person skilled in the art might envisage.

There is claimed:

1. An astrometry system comprising an astrometry first telescope having first and second sightlines respectively corresponding to first and second fields of view, a first star detector system in a first focal plane, first optical means adapted to combine first and second light beams from stars in said first and second fields of view and substantially parallel to said first and second sightlines and deliver them to said first star detector system, a second telescope having a third sightline substantially parallel to one of said first and second sightlines, a second star detector in at least one second focal plane, second optical means adapted to collect a third light beam from said stars substantially parallel to said third sightline and deliver it to said second star detector, and processor means adapted to determine the source field of view of each star detected as a function of whether it is detected either by only said first detector or conjointly by said first and second detectors.

2. The system claimed in claim 1 wherein said first optical means comprise a combination mirror and two plane entry mirrors having normals offset from each other by a first angle substantially equal to half a second angle defined between said first and second sightlines and respectively adapted to receive said first and second light beams and to reflect them toward said combination mirror.

3. The system claimed in claim 2 wherein each plane mirror has a surface area substantially equal to half the surface area of an entry pupil of said astrometry telescope.

4. The system claimed in claim 2 wherein said second angle is approximately 106°.

5. The system claimed in claim 1 wherein said first optical means comprise a concave entry mirror having first and second portions having normals each offset by a first angle substantially equal to a second angle defined between said first and second sightlines and respectively adapted to receive and to combine said first and second light beams.

6. The system claimed in claim 5 wherein each concave mirror portion has a surface area substantially equal to half the surface area of an entry pupil of said astrometry telescope.

7. The system claimed in claim 1 wherein said first detector has a first portion dedicated to detecting stars and connected to said processing means and a second portion dedicated at least to astrometry.

8. The system claimed in claim 7 wherein said second portion comprises a first subportion dedicated to astrometry and a second subportion dedicated to broadband photometry.

9. The system claimed in claim 7 wherein said first and second portions consist of detectors in the form of charge coupled devices (CCD).

10. The system claimed in claim 1 wherein said second telescope is a spectrometry telescope and said second detector comprises a first portion dedicated to star detection and connected to said processing means and a second portion dedicated to spectrometry.

11. The system claimed in claim 10 wherein said second portion comprises a first subportion dedicated to medium band photometry and a second subportion dedicated to radial velocity spectrometry.

12. An observation satellite comprising a measurement system as claimed in claim 1.

13. The satellite claimed in claim 12, adapted to rotate on itself so that said first and second detectors are scanned in accordance with a chosen scanning law.

* * * * *